United States Patent [19]

Hovan

[11] Patent Number: 4,541,775
[45] Date of Patent: Sep. 17, 1985

[54] CLEARANCE CONTROL IN TURBINE SEALS

[75] Inventor: Edward J. Hovan, Manchester, Conn.

[73] Assignee: United Technologies Corporation, Hartford, Conn.

[21] Appl. No.: 480,519

[22] Filed: Mar. 30, 1983

[51] Int. Cl.[4] .......................... F01D 25/12; F01D 5/08
[52] U.S. Cl. .................................. 415/180; 415/115; 416/95
[58] Field of Search ............... 415/115, 116, 175, 180, 415/172 A, 172 R, 173 R, 137, 139; 416/95; 60/39.75

[56] References Cited

U.S. PATENT DOCUMENTS

| | | | |
|---|---|---|---|
| 809,816 | 1/1906 | Kruesi | 415/176 |
| 2,401,826 | 6/1946 | Halford | 60/39.83 |
| 2,552,239 | 5/1951 | Warren | 415/175 |
| 2,787,440 | 4/1957 | Thompson, Jr. | 415/136 |
| 2,859,934 | 11/1958 | Halford et al. | 415/137 |
| 2,937,495 | 5/1960 | Perry | 60/39.32 |
| 3,043,560 | 7/1962 | Varadi | 416/174 |
| 3,224,194 | 12/1965 | De Feo et al. | 415/175 |
| 3,250,512 | 5/1966 | Petrie | 415/136 |
| 3,291,447 | 12/1966 | Brandon | 415/176 |
| 3,527,053 | 9/1970 | Horn | 60/39.66 |
| 3,826,084 | 7/1974 | Branstrom et al. | 415/175 |
| 3,959,966 | 6/1976 | Pearce et al. | 415/139 |
| 3,989,410 | 11/1976 | Ferrari | 415/175 |
| 4,005,946 | 2/1977 | Brown et al. | 415/136 |
| 4,184,797 | 1/1980 | Anderson et al. | 415/115 |
| 4,217,755 | 8/1980 | Williams | 415/175 |
| 4,242,042 | 12/1980 | Schwarz | 415/175 |

FOREIGN PATENT DOCUMENTS

| | | | |
|---|---|---|---|
| 0614162 | 2/1961 | Canada | 415/172 A |
| 0635902 | 2/1962 | Canada | 416/95 |
| 1207772 | 2/1960 | France | 415/176 |
| 1237157 | 6/1960 | France | 415/176 |
| 0738656 | 10/1955 | United Kingdom | 416/95 |

Primary Examiner—Robert E. Garrett
Assistant Examiner—H. Edward Li
Attorney, Agent, or Firm—Charles A. Warren

[57] ABSTRACT

A multistage turbine construction in which the cooling flow to the turbine rotor is controlled by cooperating sealing elements carried respectively by the row of vanes and by the rotor with the sealing surface carried by the vanes, the stationary surface being an outwardly sealing surface and the fins cooperating therewith carried by the rotor extending radially inward such that as the turbine rotor cools down during reduced power operation the sealing effect will be increased to reduce the flow of cooling fluid over the rotor surface.

4 Claims, 1 Drawing Figure

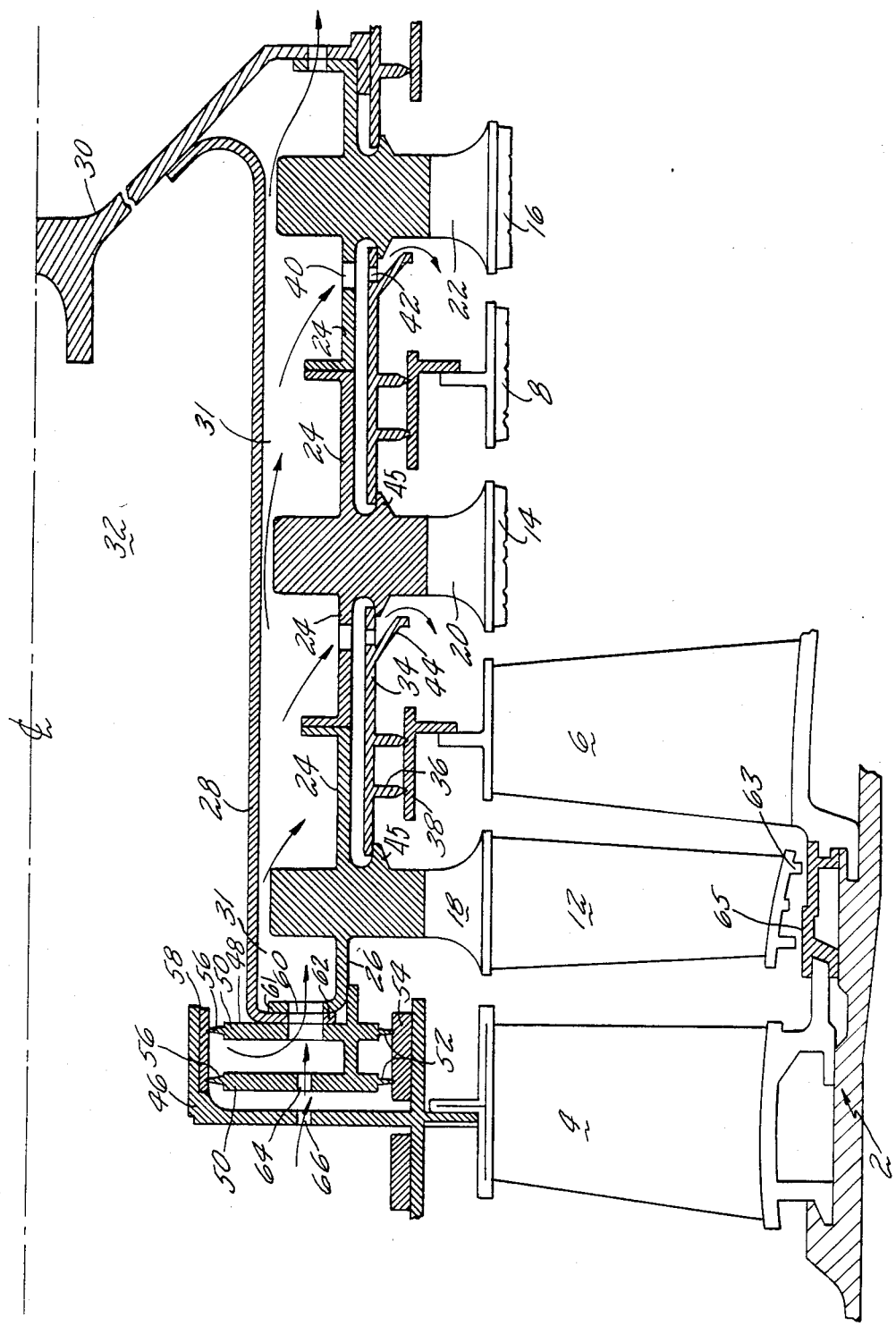

CLEARANCE CONTROL IN TURBINE SEALS

DESCRIPTION

1. Technical Field

The invention is concerned with controlling the clearance in the tip and interstage seals in a multistage gas turbine.

2. Background Art

Maintaining seal clearance over the entire flight spectrum is difficult. The thermal shrinkage of the airfoils as power is pulled back at cruise, for example, leads to large clearances and inefficiency of the turbine. This is particularly true where the tip seals and inner supports are tied to the case as opposed to a floating mount. It is desirable to maintain a minimum clearance at all conditions of operation or to maintain such a clearance as to minimize any losses resulting from excessive seal clearances.

DISCLOSURE OF INVENTION

A feature of the invention is a seal construction in which the clearance is controlled by thermal changes in the vane length resulting from engine operating conditions. Another feature is a case supported seal cooperating with a rotor seal to control seal clearance.

According to the invention the multistage rotor has its inner portion enclosed in a chamber formed by a sleeve within the rotor and sealing sleeves between the disks of the rotor. This sleeve within the rotor also forms a pressurized compartment radially inward of the sleeve. Cooling fluid from the compartment enters the chamber by passing a seal which is made up of an outer sealing surface carried by the inner ends of the row of stator vanes and an inwardly extending sealing flange carried by the rotor. As the seal clearance varies by changes in the vane temperature the amount of cooling fluid is varied to suit the turbine operation. Specifically, as the vanes cool and contract when power is reduced from max power to cruise, for example, the seal clearance decreases in order to decrease the flow of cooling fluid to the rotor. By so doing the cooling effect on the disks of the rotor is reduced and this results in a tightening of the interstage rotor seals positioned between the rows of vanes and the rotor structure.

The foregoing and other objects, features and advantages of the present invention will become more apparent in the light of the following detailed description of preferred embodiments thereof as shown in the accompanying drawing.

BRIEF DESCRIPTION OF THE DRAWING

The single figure is a fragmentary sectional view through a turbine embodying the invention.

BEST MODE FOR CARRYING OUT THE INVENTION

The case 2 for the turbine supports several rows of vanes 4, 6 and 8, with row 4 being the inlet stage of the multistage turbine.

Alternating with the rows of vanes are rows of blades 12, 14 and 16 carried by annular disks 18, 20 and 22 interconnected to one another to form the rotor by cooperating flanges 24 on opposite sides of each of the disks. A flange 26 on the upstream side of the first rotor disk 18 is secured to and supports the upstream end of a sleeve 28 extending through the rotor and secured at its other end to the rotor cone 30. The sleeve 28 forms between it and the rotor flanges 24 a chamber 31 through which cooling fluid flows for cooling the rotor. Radially inward of the sleeve 28 is a compartment 32 which is pressurized with cooling fluid for use in cooling the turbine. Extending between adjacent rotor disks radially outward from the flanges 24 are sealing sleeves 34 which carry on their outer surface sealing ribs 36 cooperating with a sealing sleeve 38 carried by the inner ends of the rows of stator vanes 6 and 8. Cooling air from the chamber 31 passes the flanges 24 through openings 40 therein and through openings 42 in the sealing sleeves to be directed over the surface of the rotor disk by a flange 44 carried by the sealing sleeve. These sealing sleeves are supported between the discs on flanges 45 on the adjacent surfaces of the discs.

The row of inlet vanes 4 carries a sealing ring 46 at the inner ends of the vanes to cooperate with a sealing member 48 carried by the flange 26 and the cooperating sleeve 28. The sealing member 48 is H shape in cross section and has axially spaced annular disks 50 carrying on their outer peripheries seal elements 52 cooperating with an internal cylindrical sealing member 54 on the sealing element 46.

The sealing member 48 also carries on the inner peripheries of the disks 50 sealing fins 56 cooperating with an outwardly facing sealing ring 58. The space between the two sealing disks communicates with the chamber 31 through a plurality of openings 60 in one of the disks 50 and overlapping flanges 61 and 62 on the cooperating flange 26 and sleeve 28.

With the sealing member 48 positioned as it is between the opposed sealing sleeves 54 and 58, it will be apparent that the clearance between the inner seal 58 will be increased as the turbine vanes are heated and the space adjacent the sealing surface 54 will be decreased at the same time. Further as the turbine power is cut back and the vanes cool down in temperature as, for example, in power reduction to cruise, the clearance at the sleeve 58 will be decreased and the clearance at the sleeve 54 will be increased. A reduction in the clearance at sleeve 58 will reduce the flow of cooling fluid to the rotor chamber 31.

The spacing of the seals at the inner ends of the disks 50 thus serves as a controlled passage for the flow of cooling fluid to the rotor and the cooling fluid from compartment 32 passes the downstream seal disk 50, flows between the disks and through the openings 60 into the chamber 31 so that it flows around the inner portions of the rotor disks and through the openings 40 and 42 to be directed over the surface of the rotor disks for cooling.

Essentially the effect of the device is that as the turbine temperature is reduced by a cutback in power as, for example, from full power to cruise, the clearance at the inner ends of the sealing disk will be reduced and the flow of cooling fluid into the chamber 31 will be reduced with the result that a cooling of the turbine disks is reduced. Since the turbine disks are, therefore, not cooled as much, the clearance existing between the seal fins 36 and the cooperating sealing sleeve 38 in the interstage seals will be kept nearly the same or may, in fact, even be reduced for minimizing the escape of cooling fluid at this point. With a decreased cooling of the turbine disks the tip seals 63 located at the tips of the turbine blades 12 will be kept closer to the surrounding case structure 65, thereby tightening the tip seal clearance and reducing the air loss past these seals. This will further improve the low power efficiency.

The face of the forward sealing disk 50 and the face of the sealing ring 46 may have aligned small diameter openings 64 and 66 therein for permitting a minimum flow of cooling fluid regardless of the clearance at the inner ends of the sealing disks.

Although the invention has been shown and described with respect to a preferred embodiment thereof, it should be understood by those skilled in the art that other changes and omissions in the form and detail thereof may be made therein without departing from the spirit and scope of the invention.

I claim:

1. In a gas turbine:

a rotor having at least two disks;

seal sleeves extending between the disks and supported by flanges on the discs and having sealing elements on their outer periphery;

one end disk carrying a sealing member having at least one inwardly extending sealing flange;

a row of vanes adjacent one end disk and at least one other row of vanes between the disks;

a sealing ring carried by the inner ends of said row of vanes and having an outer sealing surface cooperating with said sealing flange;

a sleeve extending through the rotor from said sealing member and forming with the sealing member and sealing sleeves a chamber enclosing the inner portions of the rotor disks;

said sleeve also forming inwardly of the sleeve a pressurized compartment for cooling fluid for the rotor, said cooperating sealing flange and outer sealing surface providing a clearance space for the flow of fluid from the compartment to enter the chamber.

2. A gas turbine as in claim 1 in which the sealing member has a plurality of passages therethrough for the flow of cooling fluid into the chamber.

3. A gas turbine as in claim 1 in which the sealing member has a pair of spaced sealing flanges cooperating with the outer sealing surface and the space between the sealing flanges communicates with the chamber.

4. A gas turbine as in claim 1 in which the rows of vanes between the disks carry sealing sleeves cooperating with fins on the rotor sleeves positioned between the disks.

* * * * *